United States Patent [19]
Yamamura

[11] Patent Number: 5,917,271
[45] Date of Patent: Jun. 29, 1999

[54] PIEZO-ELECTRIC DRIVING DEVICE

[75] Inventor: Hiroshi Yamamura, Hiroshima, Japan

[73] Assignees: Koyo Sangyo Co., Ltd.; USM Co., Ltd., both of Hiroshima, Japan

[21] Appl. No.: 08/809,574

[22] PCT Filed: Jul. 29, 1996

[86] PCT No.: PCT/JP96/02139

§ 371 Date: Jun. 19, 1997

§ 102(e) Date: Jun. 19, 1997

[87] PCT Pub. No.: WO97/05690

PCT Pub. Date: Feb. 13, 1997

[30] Foreign Application Priority Data

Jul. 31, 1995 [JP] Japan ................................... 7-194649

[51] Int. Cl.⁶ ............................................... H01L 41/08
[52] U.S. Cl. .......................................... 310/328; 310/323
[58] Field of Search ................................ 310/323, 328

[56] References Cited

U.S. PATENT DOCUMENTS

| | | | |
|---|---|---|---|
| 3,668,442 | 6/1972 | Vosseler | 310/323 |
| 4,613,782 | 9/1986 | Mori et al. | 310/323 |
| 5,233,258 | 8/1993 | Myoga et al. | 310/323 |

FOREIGN PATENT DOCUMENTS

| | | | |
|---|---|---|---|
| 0143682 | 9/1980 | Denmark | 310/323 |
| 57-078378 | 5/1982 | Japan . | |
| 0093477 | 6/1983 | Japan | 310/323 |
| 61-168025 | 7/1986 | Japan . | |
| 203570 | 9/1987 | Japan | 310/323 |
| 0294271 | 11/1988 | Japan | 310/323 |
| 0152976 | 6/1989 | Japan | 310/328 |
| 144372 | 6/1989 | Japan | 310/323 |
| 0264582 | 10/1989 | Japan | 310/323 |
| 6233560 | 8/1994 | Japan | 310/323 |

Primary Examiner—Mark O. Budd
Attorney, Agent, or Firm—Stevens, Davis, Miller & Mosher, L.L.P.

[57] ABSTRACT

A piezo-electric driving device capable of allowing a driven body to be made of a wide variety of materials and to be easily controlled with respect to speed and back-and-forth movement; comprising a plurality of piezoelectric oscillators 5, a supporter 1 for supporting the plural piezo-electric oscillators 5 arranged in parallel so that the piezo-electric oscillators 5 have the same oscillation direction, a connector 2 for mutually connecting the oscillation portions of the plural piezo-electric oscillators 5 in the direction perpendicular to the oscillation direction, and a kicking member 3 projected from the intermediate portion of the connector 2 in the oscillation direction, wherein the piezo-electric oscillators have different oscillation phases so that the kicking member 3 can perform a kicking operation.

17 Claims, 26 Drawing Sheets

FIG. 18A
FIG. 18B
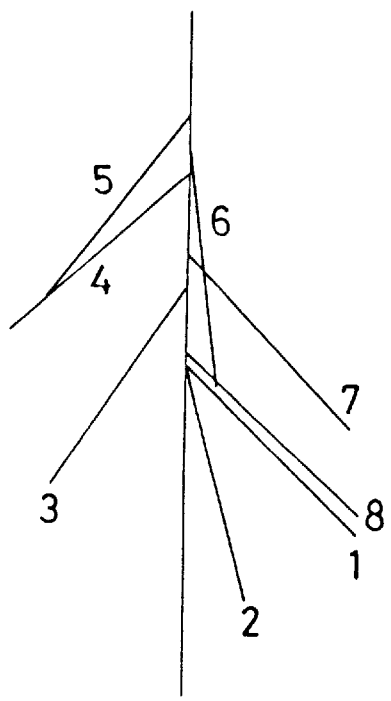
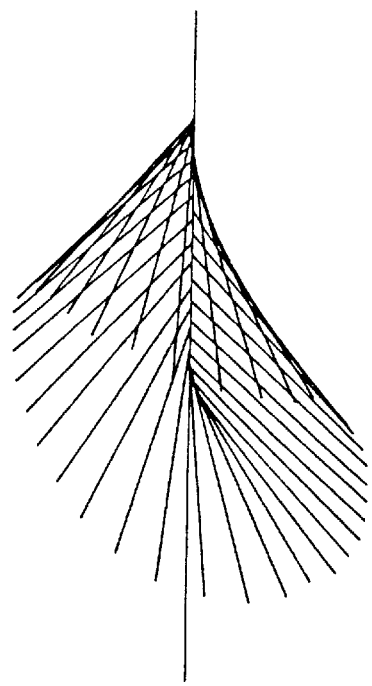

PIEZO-ELECTRIC DRIVING DEVICE

FIELD OF THE INVENTION

The present invention relates to a piezo-electric driving device for linear or circular driving.

PRIOR ART

A conventional driving device pushes its kicking member in the direction opposite to the movement direction of a driven body, and kicks the driven body so as to drive the driven body.

However, the kicking operation of the driving device is just a simple kicking-down operation exerted on the driven body, wherein the torque and speed of the operation are determined by mechanically setting various values for the lengths and positions of the kicking member. Therefore, the driving device cannot be controlled easily, and is disadvantageous in that the driving device is applicable only to driven bodies made of limited kinds of materials.

Accordingly, an object of the present invention is to provide a piezo-electric driving device capable of allowing a driven body to be made of a wide variety of materials and to be easily controlled with respect to speed and back-and-forth movement.

DISCLOSURE OF THE INVENTION

The piezo-electric driving device of the present invention comprises a plurality of piezo-electric oscillators, a supporter for supporting the plural piezo-electric oscillators arranged in parallel so that the piezo-electric oscillators have the same oscillation direction, a connector for mutually connecting the oscillation portions of the plural piezo-electric oscillators in the direction perpendicular to the oscillation direction, and a kicking member projected from the intermediate portion of the connector in the oscillation direction, wherein the piezo-electric oscillators have different oscillation phases so that the kicking member can perform a kicking operation.

In accordance with this piezo-electric driving device, when electric power is supplied to the plural piezo-electric oscillators, each piezo-electric oscillator oscillates. Because of difference in phase among the piezo-electric oscillators, the tip of the kicking member can kick a driven body in a plane including the oscillation direction of the piezo-electric oscillators, thereby moving the driven body in the kicking direction of the kicking member. In this case, the movement locus of the kicking member can be changed by changing the phase difference and amplitude of an electric signal supplied to each piezo-electric oscillator, whereby the speed and the back-and-forth movement of the driven body can be controlled easily. In addition, the material of the driven body can be selected from among a wide variety of materials.

Furthermore, the piezo-electric driving device of the present invention comprises two piezo-electric oscillators.

Moreover, the piezo-electric driving device of the present invention comprises two or more piezo-electric oscillators arranged in parallel along a straight line, the connector mutually connects the piezo-electric oscillators, and the kicking member is projected from the intermediate portion of the connector.

With this piezo-electric driving device, torque can be increased without using larger piezo-electric oscillators.

Besides, the piezo-electric driving device of the present invention comprises a plurality of piezo-electric oscillators, a supporter for supporting the plural piezo-electric oscillators arranged in a ring-shape so that the piezo-electric oscillators have the same oscillation direction, a radial connector for mutually connecting the oscillation portions of the plural piezo-electric oscillators in the direction perpendicular to the oscillation direction, and a kicking member projected from the central portion of the radial connector in the oscillation direction, wherein the piezo-electric oscillators have different oscillation phases so that the kicking member can perform kicking operation.

With this piezo-electric driving device, it is possible to change the direction of the reciprocating movement thereof.

Additionally, the piezo-electric driving device of the present invention comprises two piezo-electric oscillators, a supporter for supporting the two piezo-electric oscillators arranged in parallel, an L-shaped connector mutually connecting the two piezo-electric oscillators in the plane including the oscillation direction of the two piezo-electric oscillators, and a kicking member projected from the intermediate portion of the connector in the above-mentioned plane.

More and more, the piezo-electric driving device of the present invention comprises a piezo-electric oscillator oscillating in one direction, a supporter for supporting the piezo-electric oscillator, a stationary member provided opposite to the direction perpendicular to the oscillation direction of the piezo-electric oscillator, a connector provided between the piezo-electric oscillator and the stationary member so as to connect the piezo-electric oscillator to the stationary member, and a kicking member projected from the intermediate portion of the connector in the oscillation direction.

BRIEF DESCRIPTION OF THE DRAWINGS

FIG. 1A is a front view, FIG. 1B is a plan view, and FIG. 1C is a side view;

FIGS. 18A and 18B illustrate the movement of the kicking member when one of the piezo-electric oscillators has an advanced oscillation phase of 90 degrees, and when the other piezo-electric oscillator has a small amplitude ratio of 0.5;

FIG. 23A is a front view, and FIG. 23B is a plan view;

FIG. 27A is a front view, and FIG. 27B is a plan view;

FIG. 30A is a front view, FIG. 30B is a plan view, and FIG. 30C is a side view;

PREFERRED EMBODIMENTS OF THE INVENTION

Figure 1A:
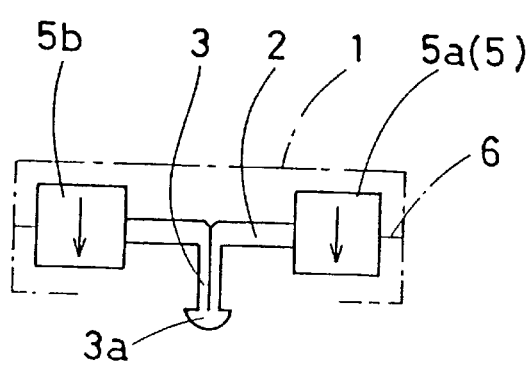
FIGS. 1A, 1B and 1C show the main region of a first embodiment of the present invention.
Figure 1B:
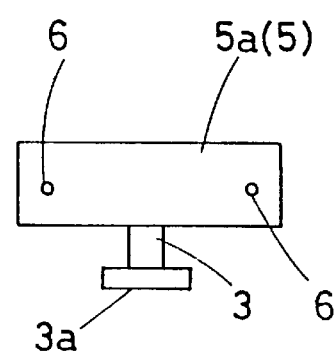
Figure 1C:
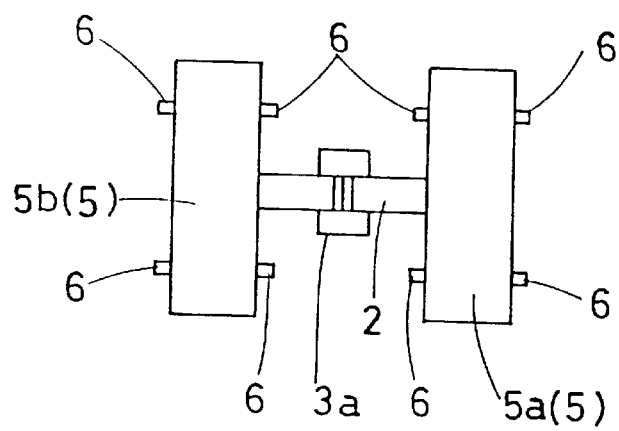
Figure 2:
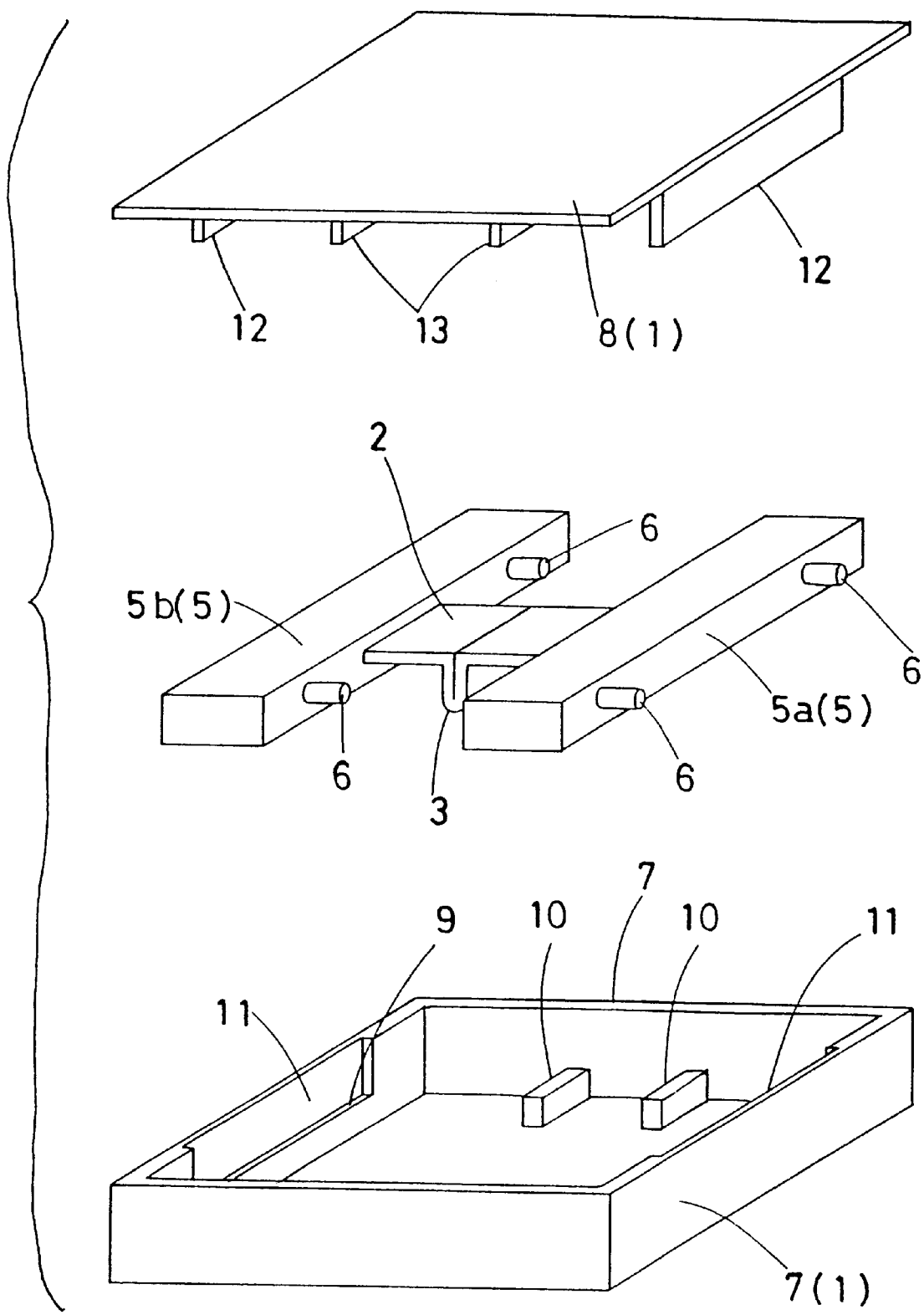
FIG. 2 is an exploded perspective general view of the first embodiment.
Figure 3:
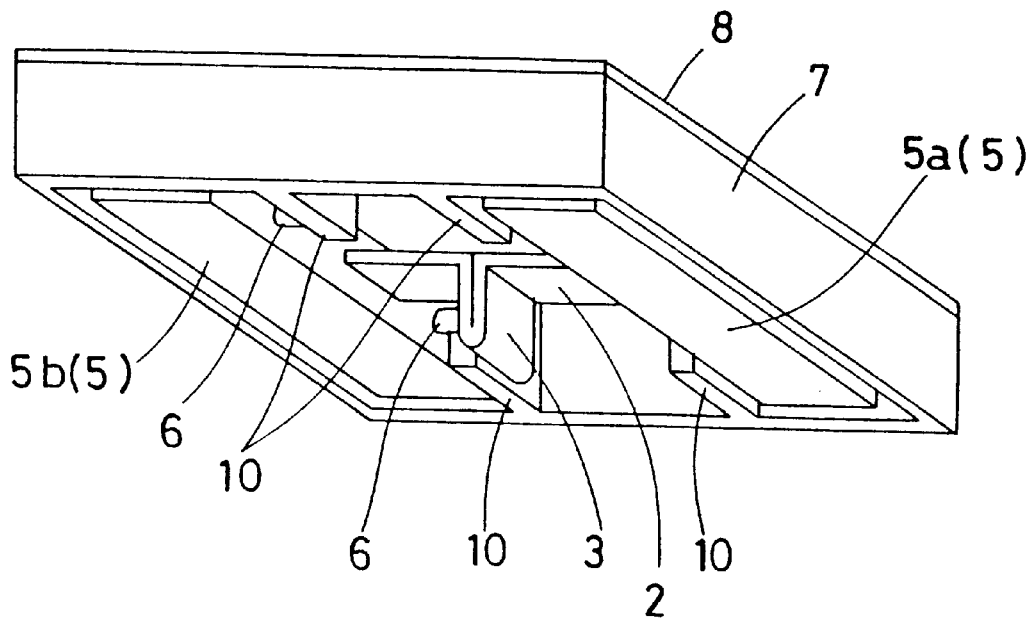
FIG. 3 is an external perspective general view of the first embodiment.

A first embodiment of the present invention is described below referring to FIGS. 1 to 22. The piezo-electric driving device of this embodiment comprises a supporter 1, a connector 2 and a kicking member 3 as shown in FIGS. 1 to 3.

The supporter 1 supports a plurality of piezo-electric oscillators 5 which are installed in parallel so that their oscillation directions are the same. The piezo-electric oscillators 5 are used as a pair (5a, 5b) and installed in parallel so that their oscillation directions are the same. When an electric signal is input, these piezo-electric oscillators 5a, 5b oscillate in the direction perpendicular to the longitudinal direction of the piezo-electric oscillators 5a, 5b. The piezo-electric oscillator is formed by attaching a piezo-electric element to the surface of a bar-like or plate-like oscillator which is made of an elastic metal, such as a constant elastic material like elinvar, and has a square or rectangular cross-section. Furthermore, the piezo-electric oscillator is made of a piezo-electric material, such as piezo-electric ceramics, or a composite piezo-electric material containing a piezo-electric material and plastic. The surface of the piezo-electric oscillator is provided with electrode terminals to which voltage is applied. The piezo-electric element and the piezo-electric ceramics have an electric strain characteristic wherein distortion/deformation, such as shrinkage or elongation, is generated when they receive electric signals. Accordingly, when the piezo-electric element shrinks, for example, at the time of voltage application to the piezo-electric element in one direction, the oscillator is warped in such a manner that the side of the piezo-electric element becomes concave. When the supply of the electric signal stops, the oscillator returns to its original form because of elastic deformation. Conversely, when voltage is applied in the opposite direction, the piezo-electric element elongates, and the oscillator is warped in such a manner that the side of the piezo-electric element becomes convex. The piezo-electric oscillator 5 is provided with shafts 6 on both sides thereof in the longitudinal direction thereof so that the center of the piezo-electric oscillator 5 can perform a simple harmonic motion around the shafts 6 with respect to the supporter 1. The frequency of the oscillator ranges from the so-called low frequency of an electric signal to an ultrasonic frequency, wherein sinusoidal oscillation (simple harmonic motion) is performed.

The supporter 1 of the embodiment comprises a frame 7 and a lid 8. The frame 7 is open on both ends, a pair of piezo-electric oscillators 5 are accommodated in the frame 7. Support portions 10 for supporting the pair of piezo-electric oscillators 5 are projected and provided between the piezo-electric oscillators 5. The shafts 6 of the oscillators 5, provided inside, are supported on the top surfaces of the support portions 10. Concave portions 11 are formed by cutting in the inside surfaces of the frame 7. The other shafts 6 of the piezo-electric oscillator 5, provided outside, are supported by the top surfaces 9 of the concave portions 11.

The lid 8 is a flat plate having a size capable of covering the top end of the frame 7. Projection pieces 12 are provided on the bottom surface of the lid 8 in the direction perpendicular to the bottom surface, and the projection pieces 12 to be fitted into the concave portions 11 are used to hold the outside shafts 6 of the piezo-electric oscillator 5. In addition, partition plates 13 are provided in the direction perpendicular to the bottom surface of the lid 8 so as to oppose the support portions 10. The support portions 10 and the partition plates 13 hold one pair of the inner shafts 6 of the piezo-electric oscillators 5 on one side, and also hold the other pair on the other side.

The connector 2 is used to mutually connect the oscillation portions of the plural piezo-electric oscillators 5 in the direction perpendicular to the oscillation direction. In the present embodiment, both ends of a bar-like or plate-like elastic metal piece are pressure-fitted into holes formed on the side surfaces of the central portions of the piezo-electric oscillators 5, which are used as the oscillation portions thereof, thereby establishing secure integration. The connector 2 tilts depending on the phase difference between the piezo-electric oscillators 5, thereby changing the movement widths in the up-and-down and left-to-right directions of the nearly circular movement of a kicking member 3, and also changing the nearly circular movement of the kicking member 3 depending on the amplitude of oscillation.

The kicking member 3 is projected in the oscillation direction from the intermediate portion of the connector 2. In the present embodiment, the central portion of the metal plate used as the connector 2 is bent into a U-shape so as to integrally form the kicking member 3. In addition, a head portion 3a is formed by crimping or the like at the tip of the kicking member 3. The kicking member 3 to be used should conform to the shape and material of a driven body. With the connector 2, the head portion 3a can rotate by taking the above-mentioned nearly circular movement, and part of the rotation can be used for a kicking operation.

The oscillation phases of the piezo-electric oscillators 5a, 5b are made different by about 45 degrees from each other so that the kicking member 3 can kick a driven body 15.

Figure 4:
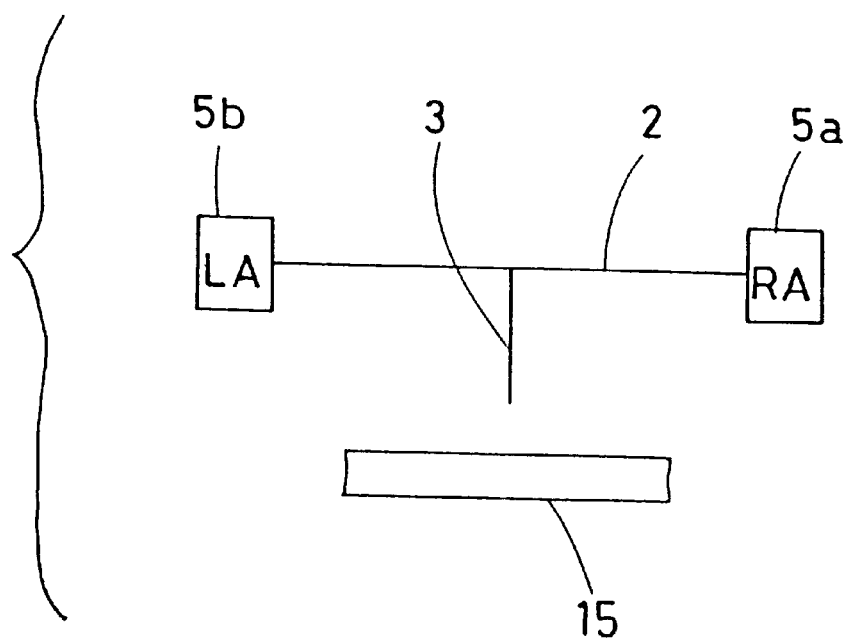
FIG. 4 illustrates the movements of the piezo-electric oscillators and the kicking member of the first embodiment, more specifically illustrating an initial condition wherein the oscillations of the piezoelectric oscillators are stopped.
Figure 5:
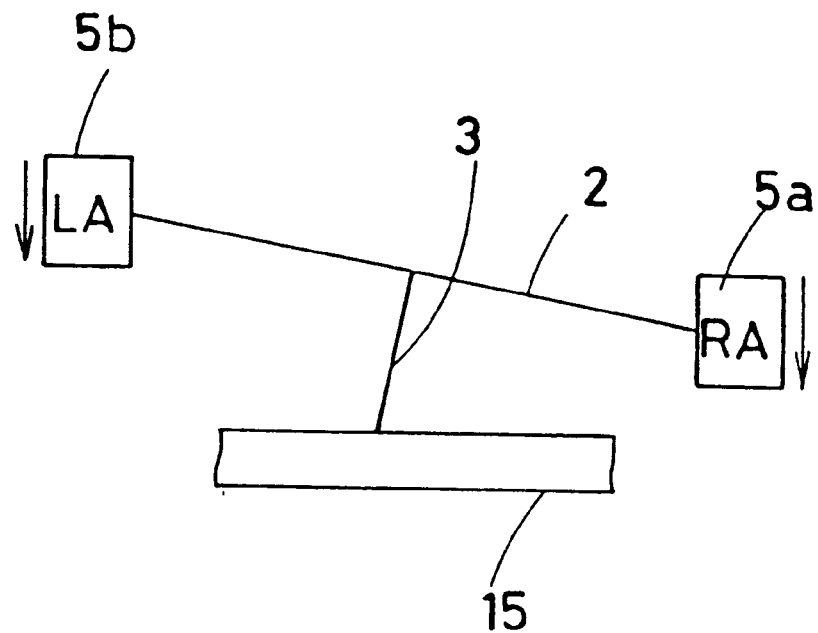
FIG. 5 illustrates a condition wherein one piezo-electric oscillator having an advanced oscillation phase of 45 degrees has moved from the stop position (0 degrees) to the position corresponding to the maximum amplitude (90 degrees) in the direction toward a driven body.
Figure 6:
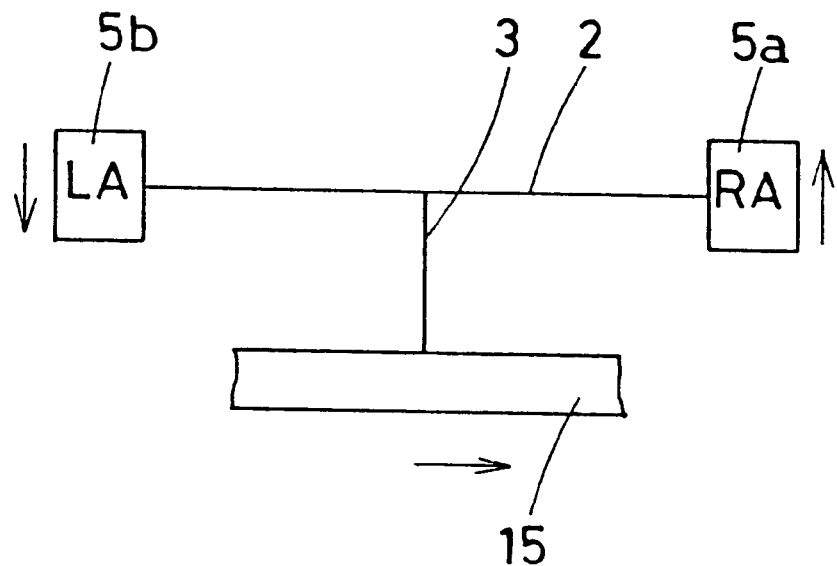
FIG. 6 illustrates a condition wherein the piezo-electric oscillator returns from the position of 90 degrees and becomes nearly parallel with the other piezo-electric oscillator having moved to the driven body after a delay.
Figure 7:
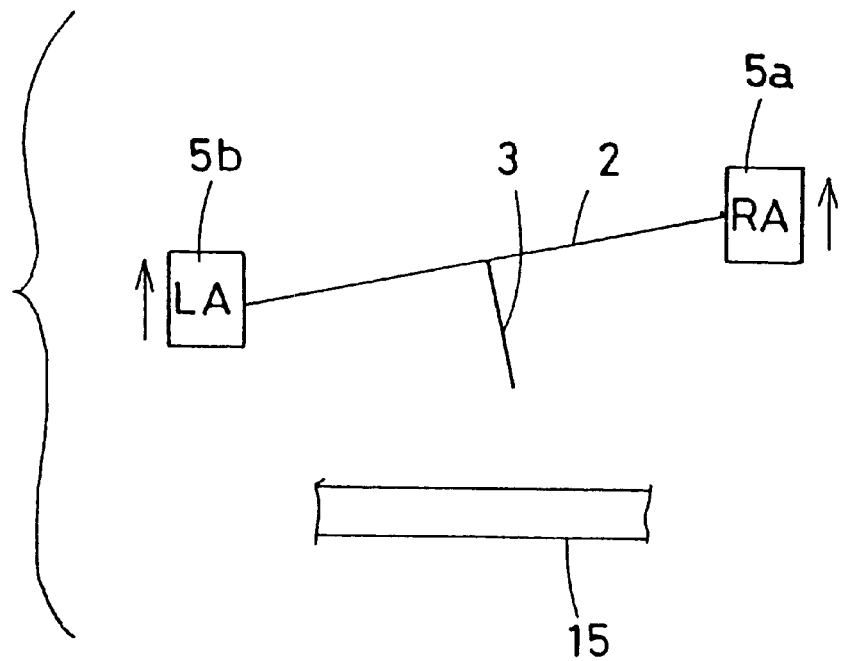
FIG. 7 illustrates a condition wherein the piezo-electric oscillator having the advanced oscillation phase moves beyond the original stop positions (0 and 180 degrees), and the other piezo-electric oscillator having a delayed oscillation phase of 45 degrees returns from the position corresponding to the maximum amplitude (90 degrees) in the direction toward the driven body and is on its way to its original stop position.
Figure 8:
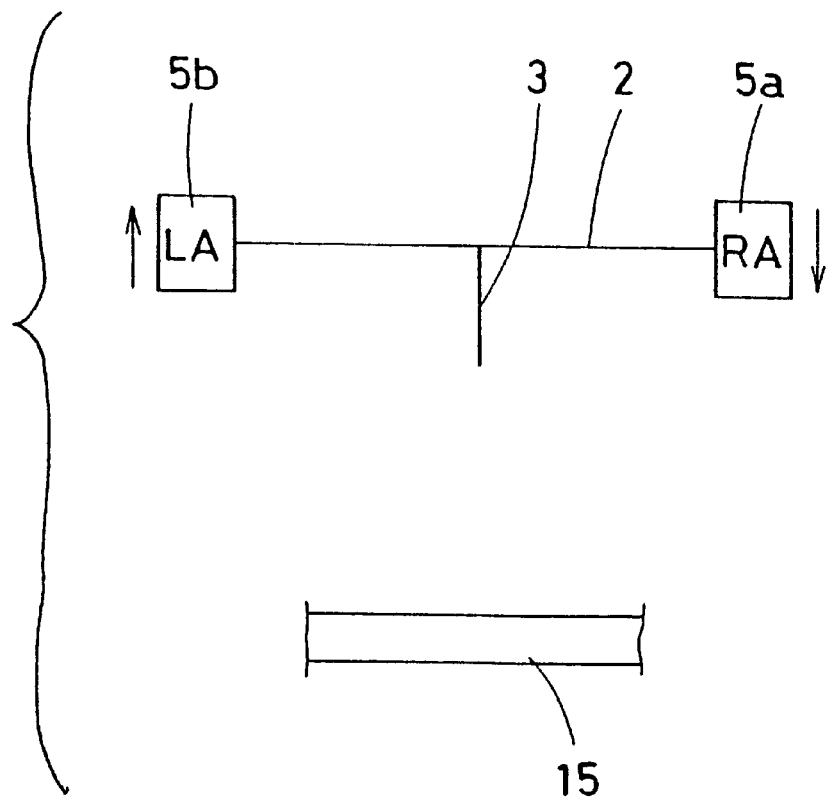
FIG. 8 illustrates a condition wherein the piezo-electric oscillator having the advanced oscillation phase returns from the position corresponding to the maximum amplitude (270 degrees) in the direction away from the driven body, and the piezo-electric oscillator having the delayed oscillation phase moves beyond the stop position (180 degrees) to the maximum amplitude position, whereby both the piezo-electric oscillators become nearly parallel with each other.
Figure 9:
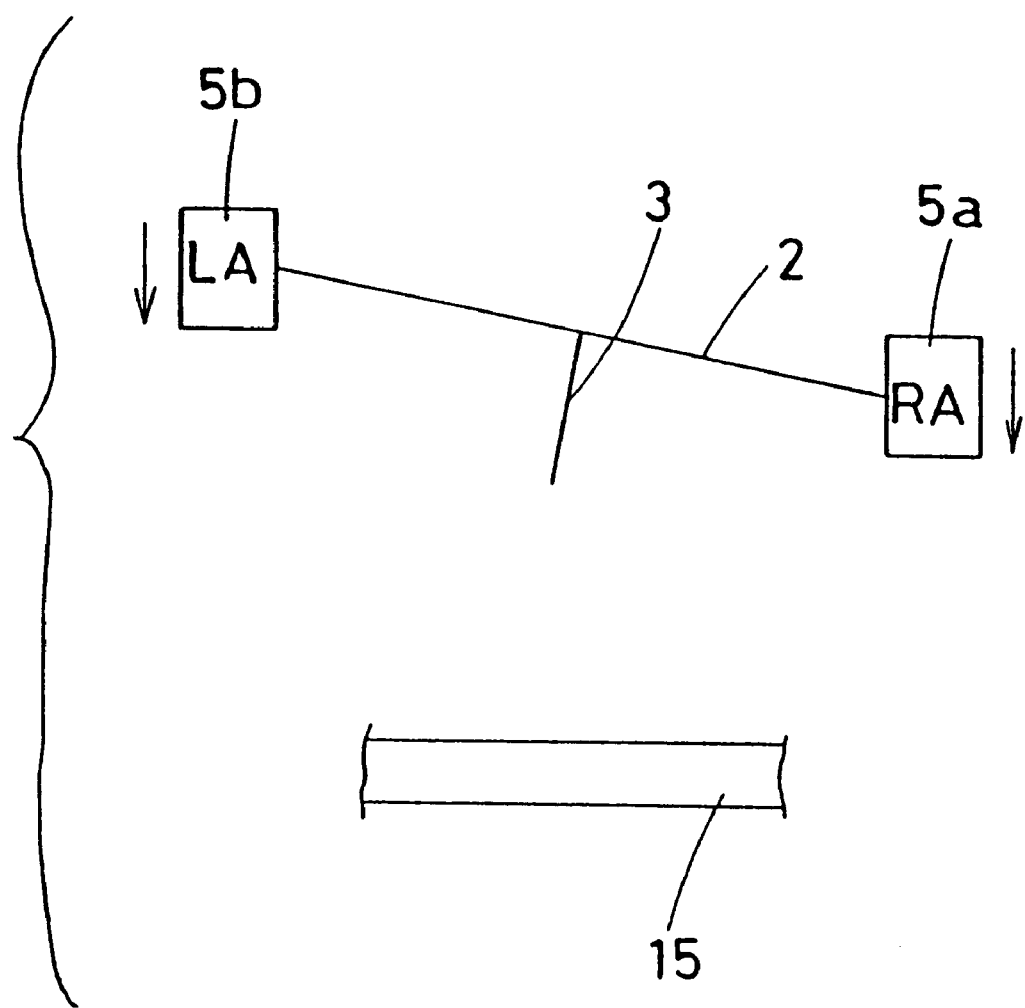
FIG. 9 illustrates a condition wherein the piezo-electric oscillator having the advanced oscillation phase approaches the stop position, 0 degrees (360 degrees), and the piezo-electric oscillator having the delayed oscillation phase returns from the position corresponding to the maximum amplitude.

To be more specific, FIGS. 4 to 9 show the operation conditions of the piezo-electric oscillators 5. Numeral 15 designates a driven body. First, FIG. 4 shows a condition wherein no electric signal is supplied to the piezo-electric oscillators 5a, 5b. The tip of the kicking member 3 is away from the driven body 15. FIG. 5 shows a condition wherein voltage is applied to the piezo-electric oscillators 5a, 5b, and the piezo-electric oscillator 5a having an advanced oscillation phase has passed 90 degrees of the oscillation period thereof, whereby the piezo-electric oscillator 5a is bent toward the driven body 15, and the kicking member 3 tilts and hits the driven body 15. FIG. 6 shows a condition wherein the piezo-electric oscillator 5a tries to return away from the driven body 15 in the direction of the arrow indicated beside the piezo-electric oscillator 5a, but the piezoelectric oscillator 5b is bent toward the driven body 15 after a delay of 45 degrees, whereby the kicking member 3 rotates so as to change its posture from a tilted posture to a vertical posture while keeping contact with the driven body 15. At the time of the rotation, the driven body 15 is kicked and undergoes a force for movement in the direction of the arrow indicated beside the kicking member 15. FIG. 7 shows a condition wherein the piezo-electric oscillator 5b has returned to its initial position. However, voltage having the polarity opposite to that of the above-mentioned voltage is applied to the piezo-electric oscillator 5a. Consequently, the kicking member 3 tilts in the direction opposite to the above-mentioned direction. FIG. 8 shows a condition wherein the phase of the piezo-electric oscillator 5a exceeds 275 degrees, and the piezo-electric oscillator 5a begins to move in the direction for returning to the initial position. By the application of voltage having the polarity opposite to the above-mentioned polarity, the piezo-electric oscillator 5b has been moved from its initial position to the 270-degree position of the oscillation period. The kicking member 3 takes a vertical posture while being kept away from the driven body 15. FIG. 9 shows a condition wherein both the piezo-electric oscillator 5a, 5b begin to move to their initial positions. The kicking member 3 tilts just as its first posture. In this way, the kicking member 3 repeatedly performs the nearly circular movement. As a result, when the phase of the piezo-electric oscillator 5a is advanced, the driven member 15 is moved from left to right, and when the phase is delayed, the driven member 15 is moved in the opposite direction.

Figure 10:
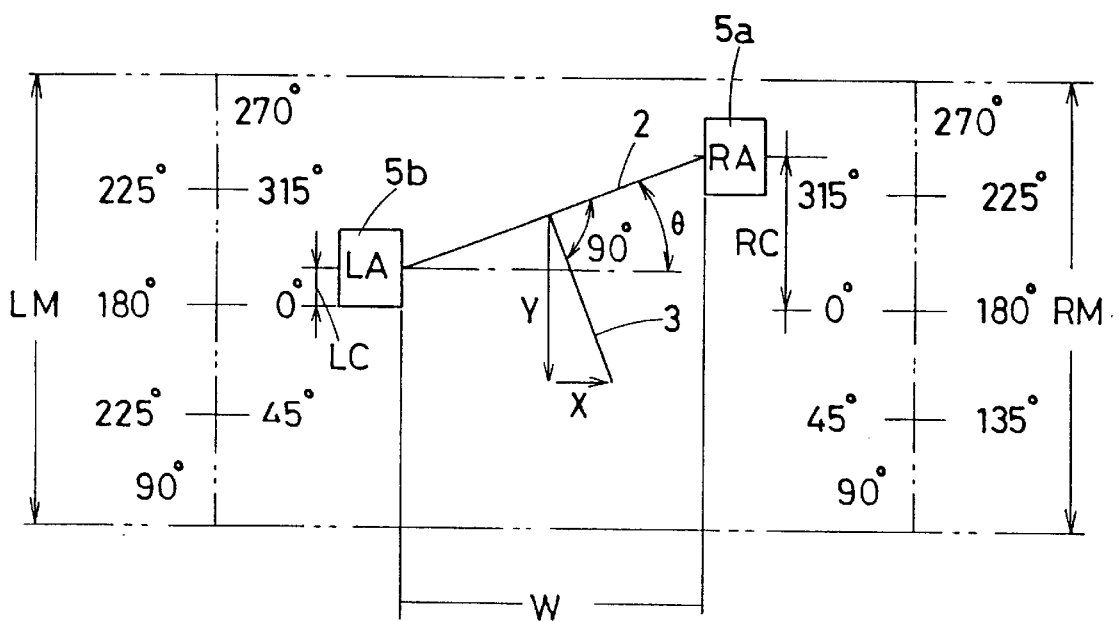
FIG. 10 illustrates a positional relationship among the piezo-electric oscillators, connector and kicking member.

FIG. 10 is a view illustrating the operating principle of the kicking member 3. It is understood that the kicking member 3 operates in various modes ranging from a nearly circular movement obtained by the following equation to a kicking operation. In FIG. 10, W designates the width of the connector 2, LM designates the amplitude of the piezo-electric oscillator 5a, RM designates the amplitude of the piezo-electric oscillator 5b, and θ designates the tilting of the connector 2. In addition, LL designates the length of the kicking member 3, $\theta_1$ designates the phase of the piezo-electric oscillator 5a, and $\theta_2$ designate the phase of the piezo-electric oscillator 5b.

Accordingly, the phase difference between the piezo-electric oscillators 5a, 5b is $\theta_1 - \theta_2$, the height LC of the connector 2 of the piezo-electric oscillator 5a is $\sin\theta_1 \times$ (LM/2), the height RC of the connector 2 of the piezo-electric oscillator 5b is $\sin\theta_2 \times$(RM/2), the tilting θ of the connector 2 is $\tan^{-1}\{(RC-LC)/W\}$, the starting point CT of the kicking member 3 is RC+{(LC−RC)/2}. The tip 3a of the kicking member 3 is positioned at LLcos θ in the Y-axis direction from the starting point CT and at LLsin θ in the X-axis direction from the Y-axis tip obtained above.

Figure 11A:
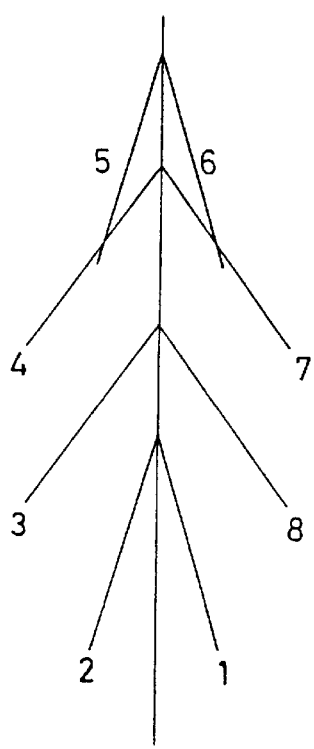
FIGS. 11A and 11B illustrate the movement of the kicking member when one of the piezo-electric oscillators has an advanced oscillation phase of 45 degrees.
Figure 11B:
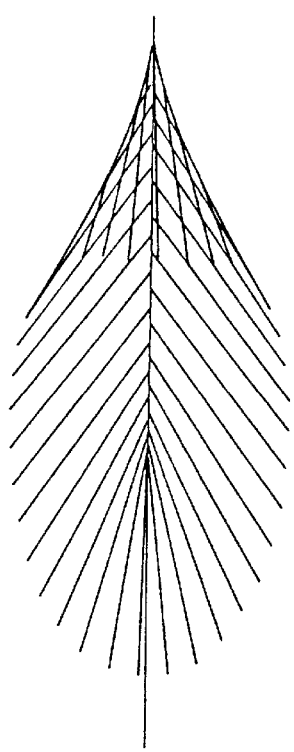
Figure 12A:
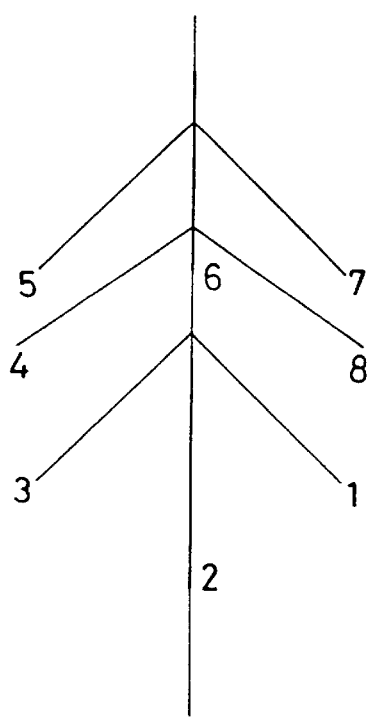
FIGS. 12A and 12B illustrate the movement of the kicking member when one of the piezo-electric oscillators has an advanced oscillation phase of 90 degrees.
Figure 12B:
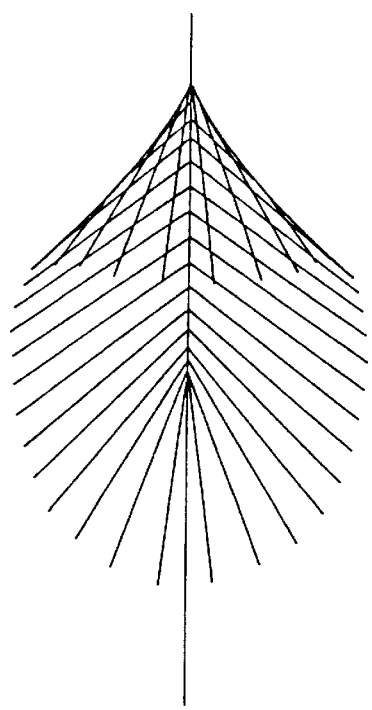
Figure 13A:
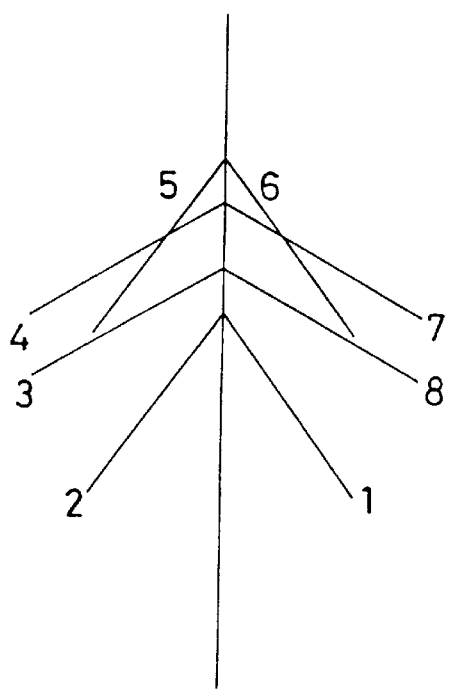
FIGS. 13A and 13B illustrate the movement of the kicking member when one of the piezo-electric oscillator has an advanced oscillation phase of 135 degrees.
Figure 13B:
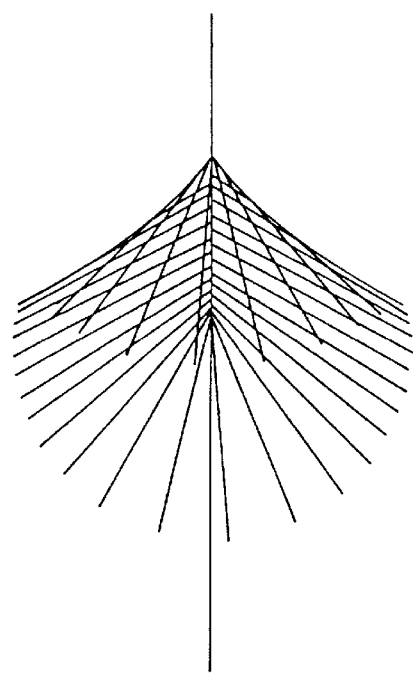

FIGS. 11 to 22 show the movement loci of the kicking member 3 depending on the oscillation phase difference between the piezo-electric oscillators 5a, 5b and also depending on the amplitudes of their oscillations. In FIGS. 11 to 22, the narrower the space between movements, the lower the movement speed, and the wider the space between movements, the higher the movement speed. In FIG. 11, the oscillation phase of the piezo-electric oscillator 5b is advanced 45 degrees, and the amplitudes of the two oscillators are the same. In FIG. 11A, the codes assigned to the kicking member 3 designate the sequence of the movement. FIG. 11B is a finer representation of the movement locus of the kicking member 3. FIG. 12 shows movement locus obtained when the oscillation phase of the piezo-electric oscillator 5b is advanced 90 degrees. FIG. 13 shows movement locus obtained when the oscillation phase of the piezo-electric oscillator 5b is advanced 135 degrees. As obviously indicated by these movement loci, the larger the phase difference between the piezo-electric oscillators 5a, 5b, the higher the tilting of the kicking member 3, and the smaller the up-and-down movement. In other words, the larger the phase difference, the higher the movement speed of the driven body 15. The smaller the phase difference, the more significant the kicking of the driven body 15. In addition, the kicking member 3 rotates clockwise, and the driven member 15 shown in FIG. 14 and the like is moved from right to left.

Figure 14A:
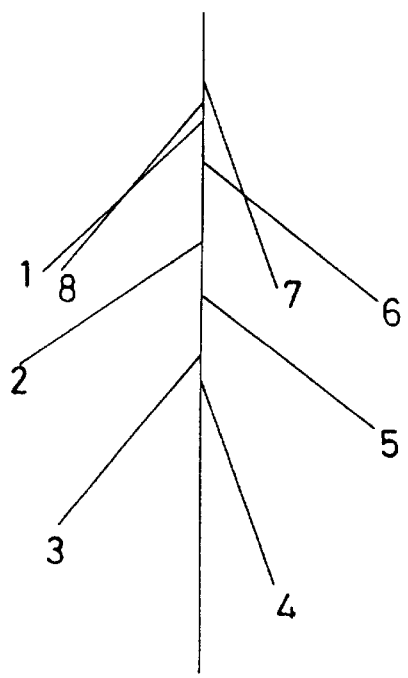
FIGS. 14A and 14B illustrate the movement of the kicking member when one of the piezo-electric oscillators has a delayed oscillation phase of 45 degrees.
Figure 14B:
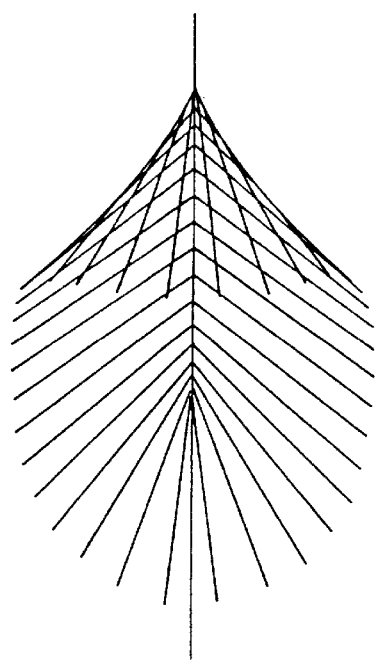

FIG. 14 shows the movement locus obtained when the oscillation phase of the piezo-electric oscillator 5b is delayed 90 degrees. The driven body 15 is moved in the direction opposite to the above-mentioned direction, namely, from left to right.

Figure 15A:
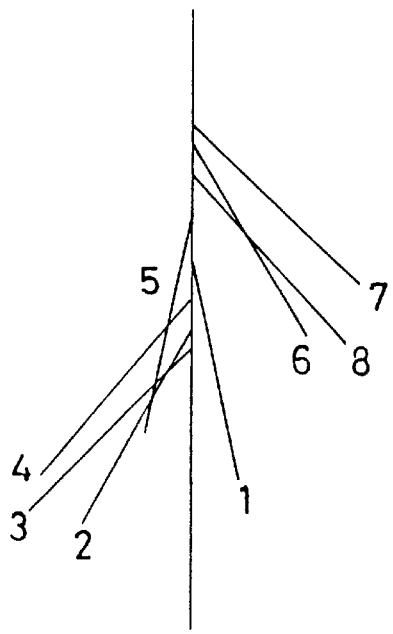
FIGS. 15A and 15B illustrate the movement of the kicking member when one of the piezo-electric oscillators has an advanced oscillation phase of 90 degrees and has a small amplitude ratio of 0.2, and when the other piezo-electric oscillator has an amplitude ratio of 1.
Figure 15B:
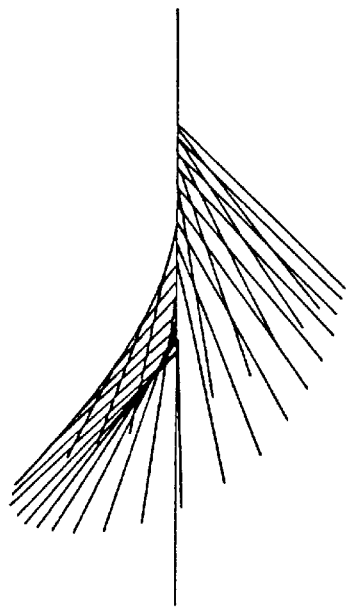

FIG. 15 shows the movement locus obtained when the oscillation phase of the piezo-electric oscillator 5b is advanced 90 degrees, the amplitude ratio of the piezoelectric oscillator 5b is 0.2 and the amplitude ratio of the piezo-electric oscillator 5a is 1.0. The movement speed of the kicking member 3 is high near a position where the head portion 3a of the kicking member 3 makes contact with the driven body 15. After the contact, the kicking member 3 moves slowly. In other words, kicking down is performed quickly, and the movement speed of the kicking member 3 is low after making contact with the driven body 15. Therefore, this movement is appropriate for handling the driven body 15 made of a material having low repulsion.

Figure 16A:
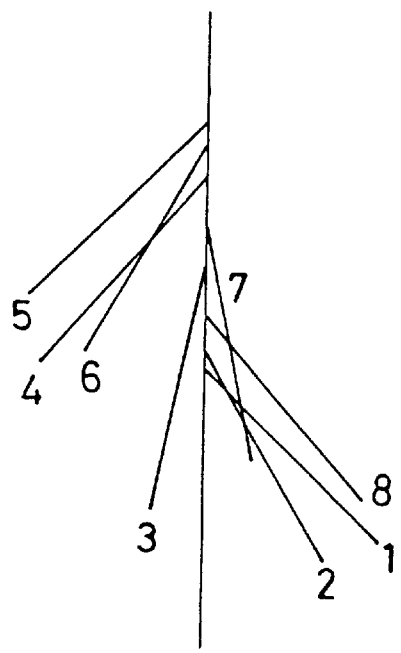
FIGS. 16A and 16B illustrate the movement of the kicking member when one of the piezo-electric oscillators has an advanced oscillation phase of 90 degrees, and when the other piezo-electric oscillator has a small amplitude ratio of 0.2.
Figure 16B:
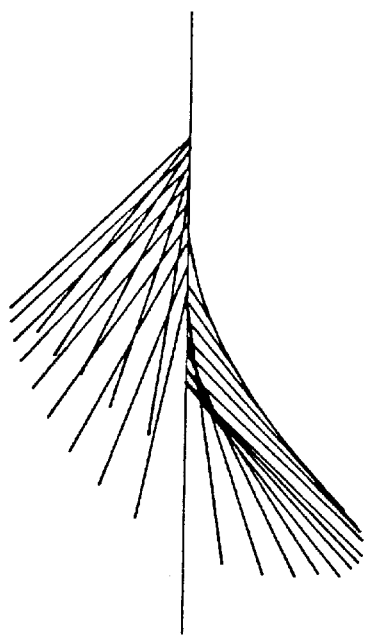

FIG. 16 shows the movement locus obtained when the oscillation phase of the piezo-electric oscillator 5b is advanced 90 degrees, the amplitude ratio of the piezoelectric oscillator 5b is 1.0 and the amplitude ratio of the piezo-electric oscillator 5a is 0.2. The movement speed of the kicking member 3 is low near the position where the head portion 3a of the kicking member 3 makes contact with the driven body 15. After the contact, the kicking member 3 moves fast. In other words, kicking down is performed slowly, and the movement speed of the kicking member 3 is high after making contact with the driven body 15. Therefore, this movement is appropriate for handling the driven body 15 made of a material having high repulsion.

Figure 17A:
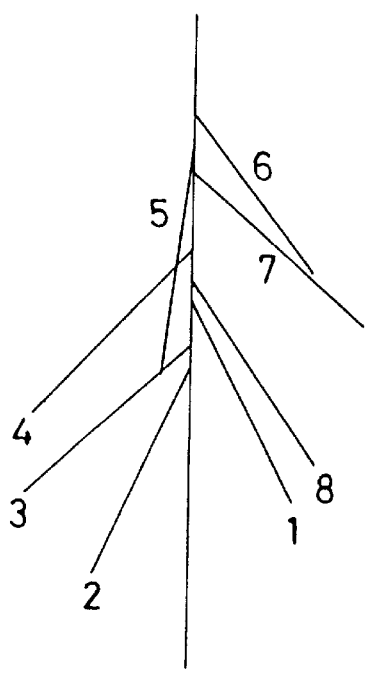
FIGS. 17A and 17B illustrate the movement of the kicking member when one of the piezo-electric oscillators has an advanced oscillation phase of 90 degrees, and has a small amplitude ratio of 0.5.
Figure 17B:
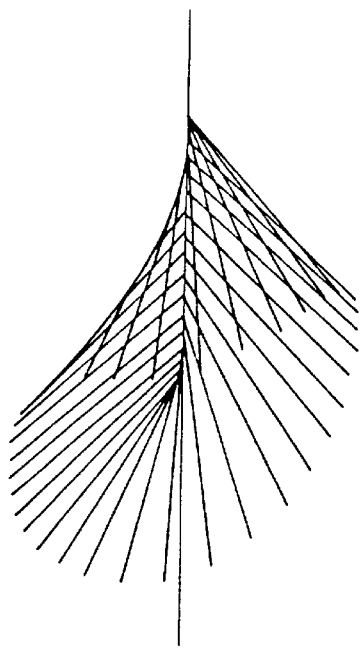
Figure 19A:
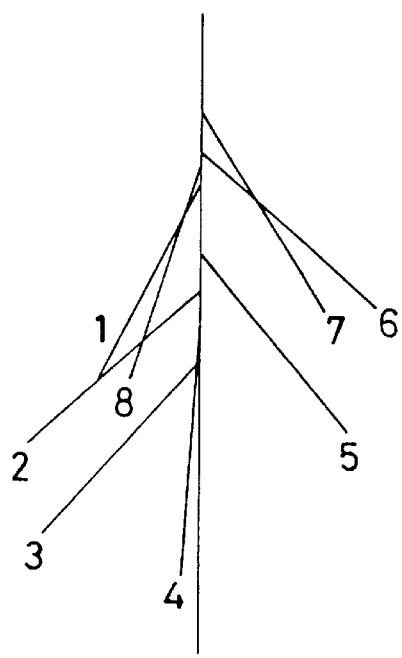
FIGS. 19A and 19B illustrate the movement of the kicking member when one of the piezo-electric oscillators has a delayed oscillation phase of 90 degrees, and has a small amplitude ratio of 0.5.
Figure 19B:
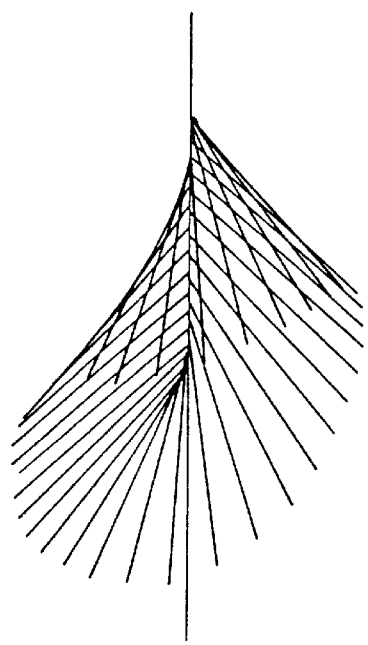
Figure 20A:
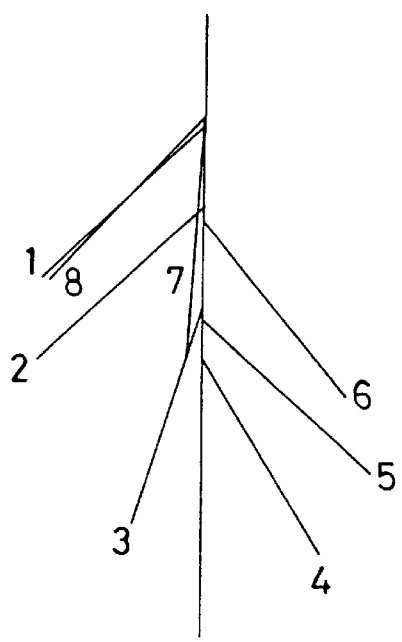
FIGS. 20A and 20B illustrate the movement of the kicking member when one of the piezo-electric oscillators has a delayed oscillation phase of 90 degrees, and when the other piezo-electric oscillator has a small amplitude ratio of 0.5.
Figure 20B:
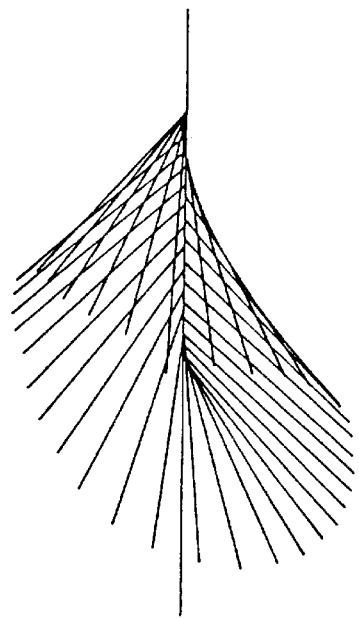

FIG. 17 shows the movement locus obtained when the oscillation phase of the piezo-electric oscillator 5b is advanced 90 degrees, the amplitude ratio of the piezoelectric oscillator 5b is 0.5 and the amplitude ratio of the piezo-electric oscillator 5a is 1.0. In the same way, FIG. 18 shows the movement locus obtained when the oscillation phase of the piezo-electric oscillator 5b is advanced 90 degrees, the amplitude ratio of the piezo-electric oscillator 5b is 1.0 and the amplitude ratio of the piezo-electric oscillator 5a is 0.5. FIG. 19 shows the movement locus obtained when the oscillation phase of the piezo-electric oscillator 5b is delayed 90 degrees, the amplitude ratio of the piezo-electric oscillator 5b is 0.5 and the amplitude ratio of the piezo-electric oscillator 5a is 1.0. FIG. 20 shows the movement locus obtained when the oscillation phase of the piezoelectric oscillator 5b is delayed 90 degrees, the amplitude ratio of the piezo-electric oscillator 5b is 1.0 and the amplitude ratio of the piezo-electric oscillator 5a is 0.5.

Figure 21A:
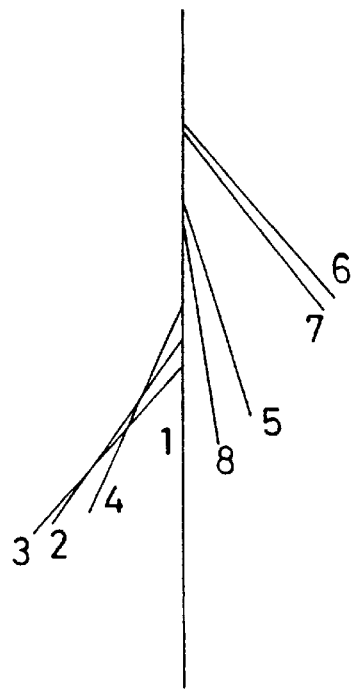
FIGS. 21A and 21B illustrate the movement of the kicking member when one of the piezo-electric oscillators stops.
Figure 21B:
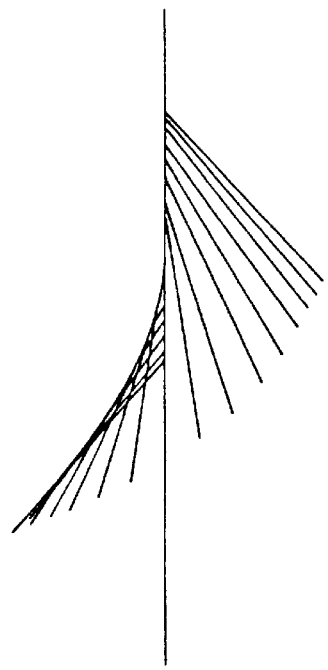
Figure 22A:
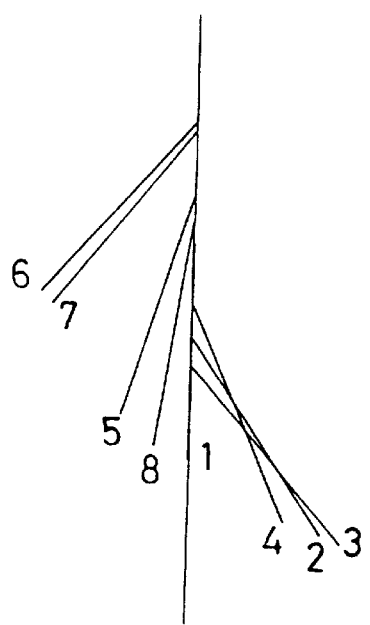
FIGS. 22A and 22B illustrate the movement of the kicking member when the other piezo-electric oscillator stops.
Figure 22B:
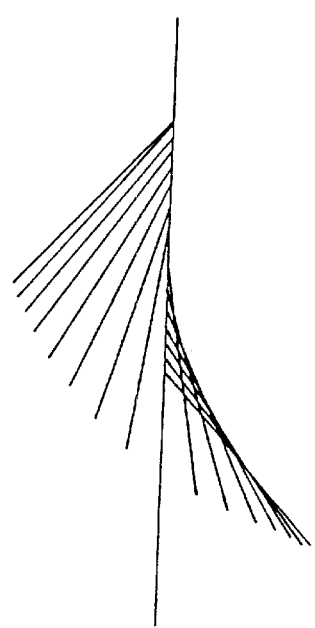

Furthermore, FIG. 21 shows the movement locus obtained when the amplitude ratio of the piezo-electric oscillator 5b is 0 and the amplitude ratio of the piezo-electric oscillator 5a is 1.0. In other words, only the piezo-electric oscillator 5a is oscillated. In this case, the driven body 15 is kicked down and driven from right to left. FIG. 22 shows the movement locus obtained when the amplitude ratio of the piezo-electric oscillator 5b is 1.0 and the amplitude ratio of the piezo-electric oscillator 5a is 0. In other words, only the piezo-electric oscillator 5b is oscillated. In this case, the driven body 15 is kicked down and driven from left to right.

In accordance with this embodiment, when electric power is supplied to the plural piezo-electric oscillators 5, the piezo-electric oscillators 5 oscillate. Because of difference in phase among the piezo-electric oscillators 5, the tip of the kicking member 3 can kick the driven body 15 in a plane including the oscillation direction of the piezo-electric oscillators 5, thereby capable of moving the driven body 15 in the kicking direction of the kicking member 3.

In this case, the movement locus of the kicking member 3 can be changed by changing the phase difference, period and amplitude of the electric signal supplied to the piezo-electric oscillators 5, whereby the speed and the back-and-forth movement of the driven body 15 can be controlled easily.

In other words, by controlling the electric signal supplied to the piezo-electric oscillators 5, the kicking timing of the kicking member 3 can be controlled, and the tip of the kicking member 3 can be set to perform a wide variety of operations ranging from a nearly circular movement to a kicking-down movement. As a result, the speed and the width of the kicking-down movement can be changed, and the back-and-forth movement can be controlled. In addition, the shape of the connector 2 can have a high degree of freedom. The installation angles and positional relationship of the piezo-electric oscillators 5 can also have a high degree of freedom.

Furthermore, by changing the locus of the kicking movement of the kicking member 3, the material of the driven body 15 can be selected from among a wide variety of materials. Moreover, the torque and speed of the kicking movement can be changed by mechanical settings with respect to the length and position of the kicking member 3.

Figure 23A:
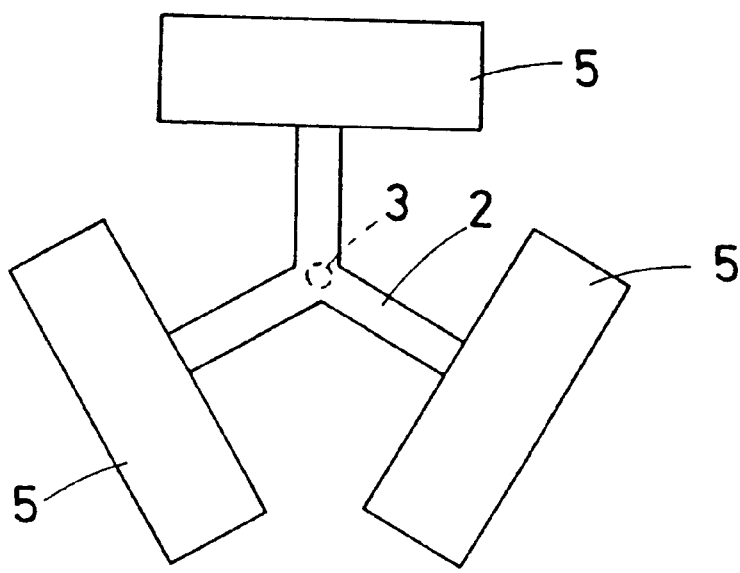
FIGS. 23A and 23B show the main region of a second embodiment.
Figure 23B:
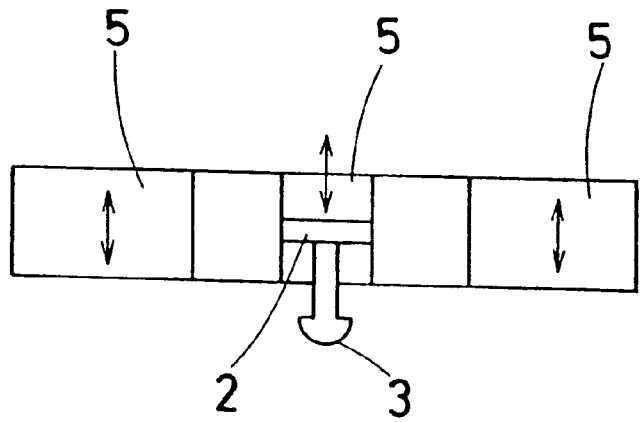

FIG. 23 shows a second embodiment of the present invention. More specifically, the piezo-electric driving device of the second embodiment has three piezo-electric oscillators 5 arranged in a ring shape and supported by a supporter 1. The piezo-electric oscillators 5 are mutually connected by a connector 2 having a radial shape, namely, a Y-shape in the case of the present embodiment. A kicking member 3 is provided at the center of the radial connector 2. Excluding the above-mentioned features, the second embodiment is the same as the first embodiment.

In the present embodiment, when voltage is applied to the piezo-electric oscillators 5, the piezo-electric oscillators 5 oscillate independently. The tilted posture of the kicking member 3 is determined by the posture of the connector 2 which is subjected to the oscillation. However, by controlling the voltage applied to each piezo-electric oscillator 5, the kicking member 3 can be moved as shown in FIGS. 11 to 21.

For example, when the same phase and amplitude are provided to two of the piezo-electric oscillators 5, the driven body 15 can be moved from the kicking member 3 to the intermediate direction of the two piezo-electric oscillators 5 or to the direction of the other piezo-electric oscillator 5 depending on the phase difference between the two piezo-electric oscillators 5 and the other piezo-electric oscillator 5. Accordingly, the driven body 15 can be moved forward, backward and diagonally by changing the combinations of the two piezo-electric oscillators 5.

In addition to the effect obtained by the first embodiment, the effect of changing the direction of the reciprocating movement can be obtained by the second embodiment.

Figure 24:
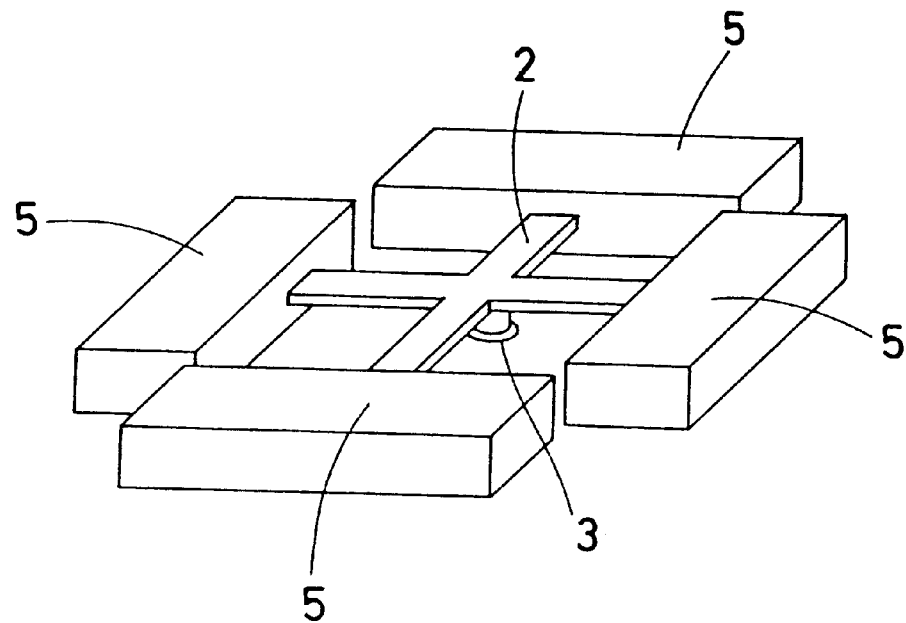
FIG. 24 is a perspective view showing the main region of a third embodiment.
Figure 25:
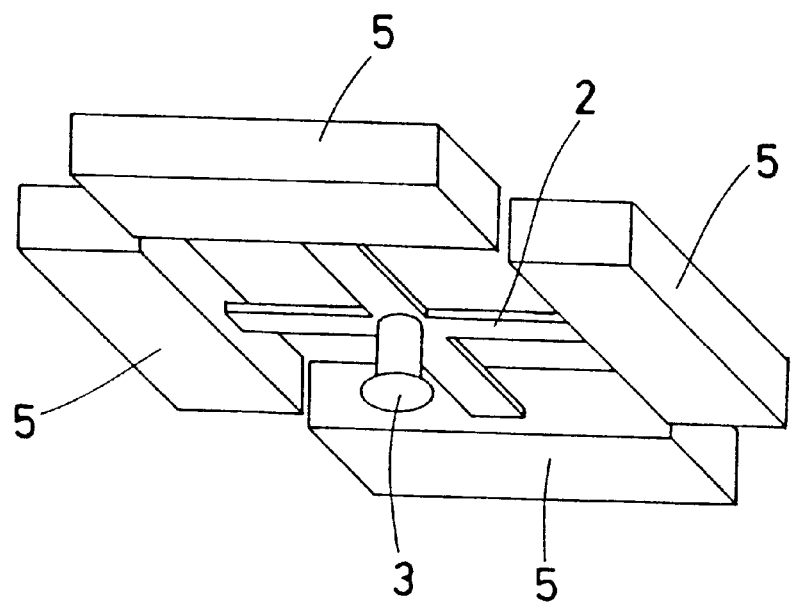
FIG. 25 is a perspective bottom view of the third embodiment.
Figure 26A:
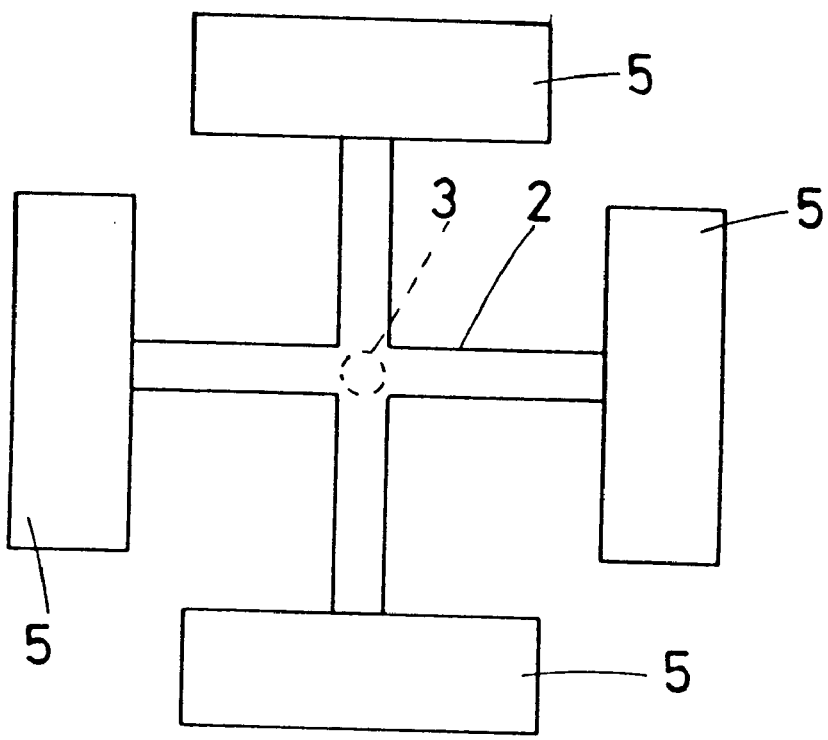
FIG. 26A is a plan view.
Figure 26B:
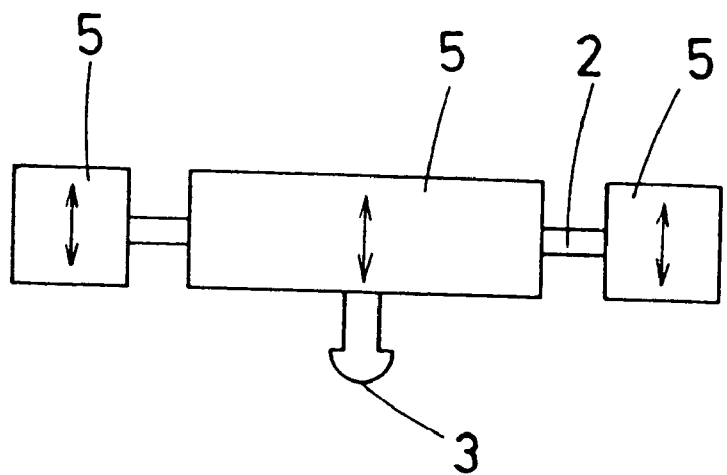
FIG. 26B is a front view.

A third embodiment of the present embodiment is shown in FIGS. 24 to 26. More specifically, the piezo-electric driving device of the third embodiment has four piezo-electric oscillators 5 arranged in a ring shape and supported by a supporter 1. The piezo-electric oscillators 5 are mutually connected by a connector 2 having a radial shape, namely, a cross-like shape. A kicking member 3 is provided at the center of the connector 2 having the radial shape. Just as in the case of the second embodiment, the movements of the connector 2 and the kicking member 3, determined by the oscillations of the piezo-electric oscillators 5, are shown in FIGS. 11 to 21.

For example, when two opposed piezo-electric oscillators 5 are provided with a phase difference and an amplitude, and when the other two opposed piezo-electric oscillators 5 are oscillated freely, the driven body 15 can be moved in the longitudinal direction of the former opposed piezo-electric oscillators 5. In the same way, when the latter two opposed piezo-electric oscillators 5 are provided with a phase difference and an amplitude, and when the former two opposed piezo-electric oscillators 5 are oscillated freely, the driven body 15 can be moved in the longitudinal direction of the latter opposed piezo-electric oscillators 5. In addition, when two adjacent piezo-electric oscillators 5 are provided with a phase and an amplitude, and when the other two adjacent piezo-electric oscillators 5 are also provided with a phase and an amplitude, which are different from those described above, the driven body 15 can be driven in the intermediate direction between the former two adjacent piezo-electric oscillators 5 or in the intermediate direction between the latter two adjacent piezo-electric oscillators 5 depending on the phase difference between the former two adjacent piezo-electric oscillators 5 and the latter two adjacent piezo-electric oscillators 5. As a result, the driven body 15 can be moved back-and-forth, left-to-right and diagonally. Excluding the above-mentioned features, the third embodiment is the same as the first and second embodiments.

Figure 27A:
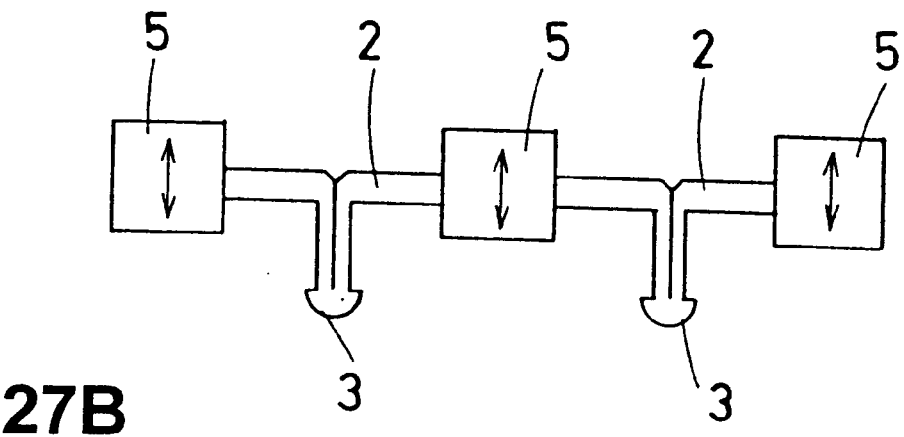
FIGS. 27A and 27B show the main region of a fourth embodiment.
Figure 27B:
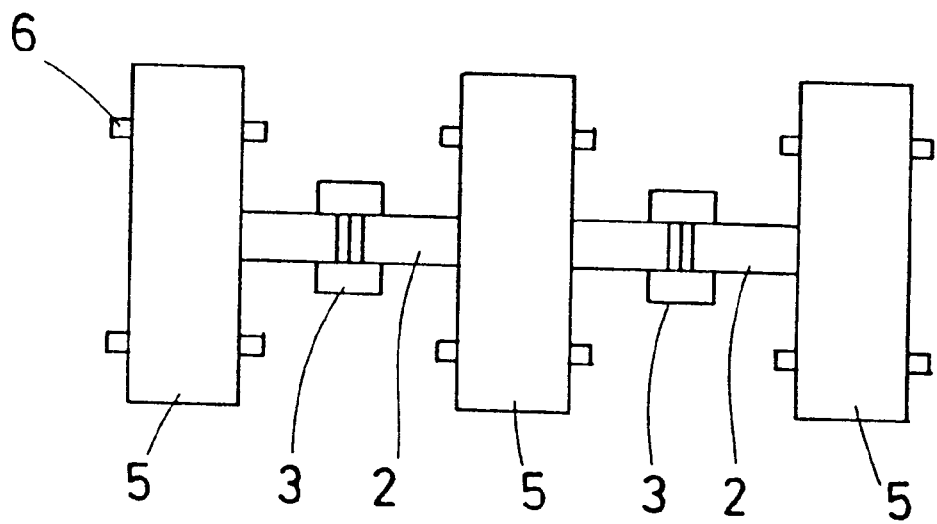

A fourth embodiment of the present embodiment is shown in FIG. 27. More specifically, the piezo-electric driving device of the fourth embodiment has two or more piezo-electric oscillators 5, namely, three piezo-electric oscillators 5 in the fourth embodiment, arranged in parallel, and mutually connected with connectors 2. A kicking member 3 is provided at the intermediate portion of each connector 2. Excluding the above-mentioned features, the fourth embodiment is the same as the first embodiment.

With the fourth embodiment, torque can be increased without using larger piezo-electric oscillators 5.

Figure 28:
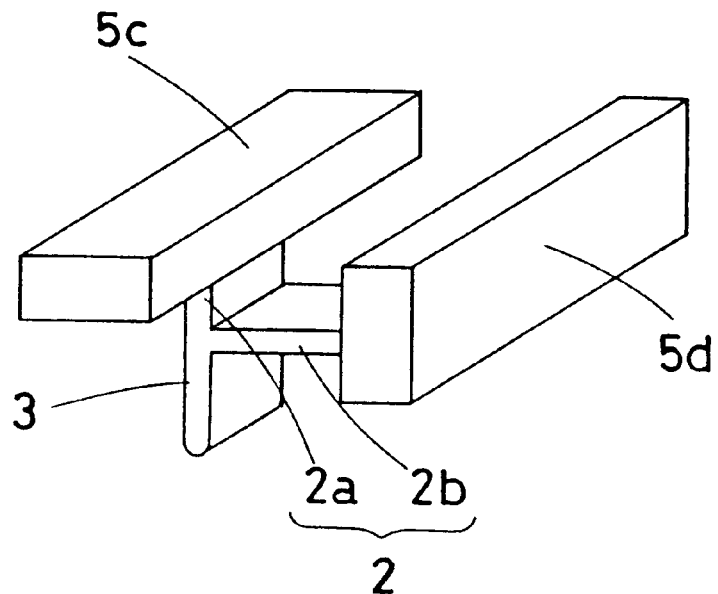
FIG. 28 is a perspective view showing the main region of a fifth embodiment.
Figure 29:
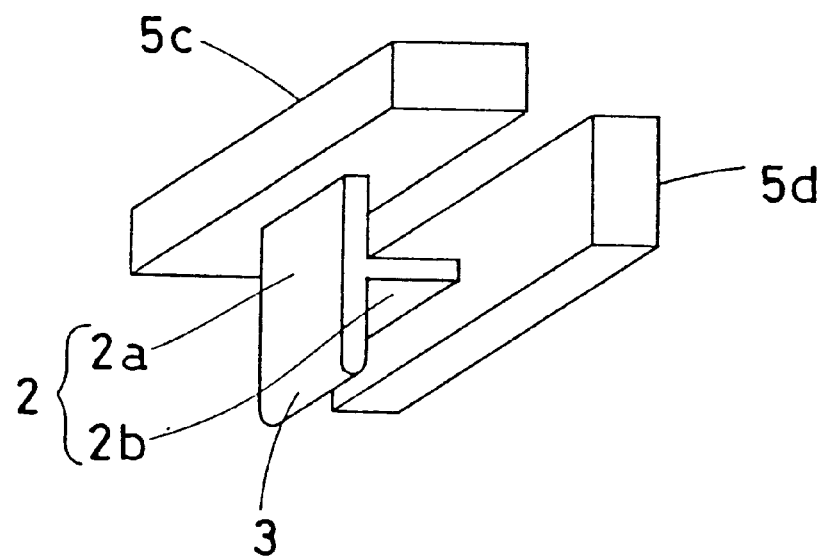
FIG. 29 is a perspective bottom view of the fifth embodiment.
Figure 30A:
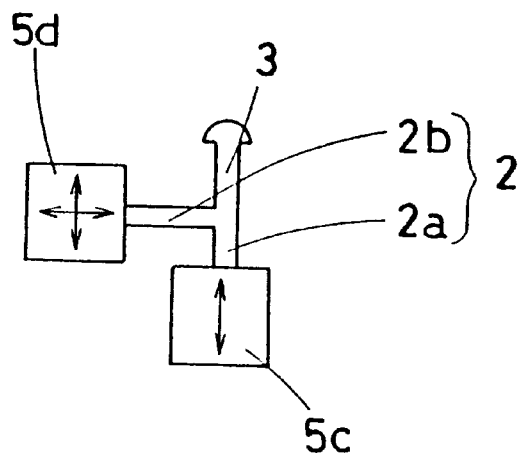
FIGS. 30A, 30B and 30C show the main region of a fifth embodiment.
Figure 30B:
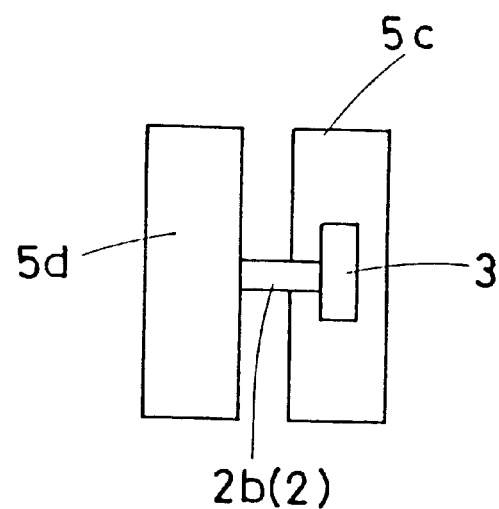
Figure 30C:
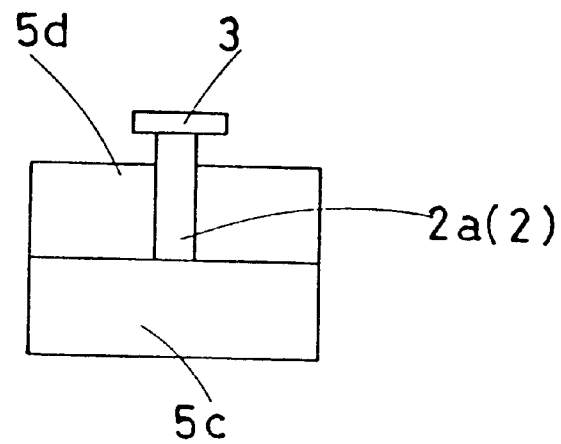

A fifth embodiment of the present embodiment is shown in FIGS. 28 to 30. More specifically, the piezo-electric driving device of the fifth embodiment has two piezo-electric oscillators 5c, 5d, and the two piezo-electric oscillators 5c, 5d are mutually connected by an L-shaped connector 2 comprising two connector portions 2a, 2b, which are perpendicular to each other in the plane including the oscillation directions of the two piezo-electric oscillators 5c, 5d. A kicking member 3 is projected from the intermediate portion of the connector 2 in the above-mentioned plane.

In the fifth embodiment, the piezo-electric oscillator 5c oscillates in the connection direction of the connector 2, and the piezo-electric oscillator 5d oscillates in the oscillation direction of the connector 2. In addition, the kicking member 3 is projected from the angle portion of the connector 2 in the direction opposite to the piezo-electric oscillator 5c.

In the case of the fifth embodiment, when the piezo-electric oscillator 5c oscillates, the connector portion 2b rocks in the oscillation direction. When the piezo-electric oscillator 5d oscillates, the connector portion 2a rocks in the oscillation direction. Consequently, the kicking member 3 can perform kicking.

Furthermore, when the piezo-electric oscillator 5d oscillates in parallel with the oscillation direction of the piezo-electric oscillator 5c, the kicking member 3 can have increased intensity of swing.

Besides, it may be possible to oscillate the piezo-electric oscillator 5c in two directions. Additionally, oscillation can be accomplished in any desired direction depending on the combination of oscillations in two directions.

In case the driven body 15 is not required to be moved by the nearly circular movement of the kicking member 3, when one of the oscillations of the piezo-electric oscillators 5c, 5d is stopped, the kicking member 3 performs only a kicking-down operation as shown in FIGS. 21 and 22. Furthermore, the installation positions and the oscillation directions of the piezo-electric oscillators 5c, 5d can be changed flexibly by using the connector 2. Excluding the above-mentioned features, the fifth embodiment is the same as the first embodiment.

Figure 31:
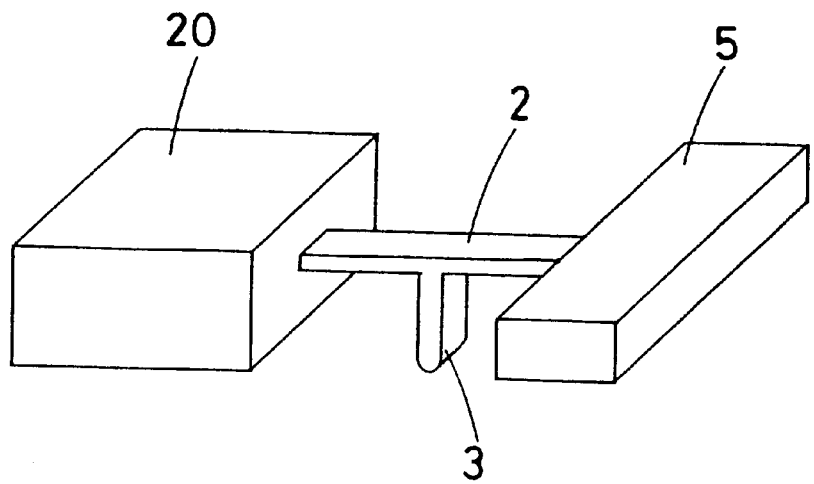
FIG. 31 is a perspective view showing the main region of a sixth embodiment.
Figure 32A:
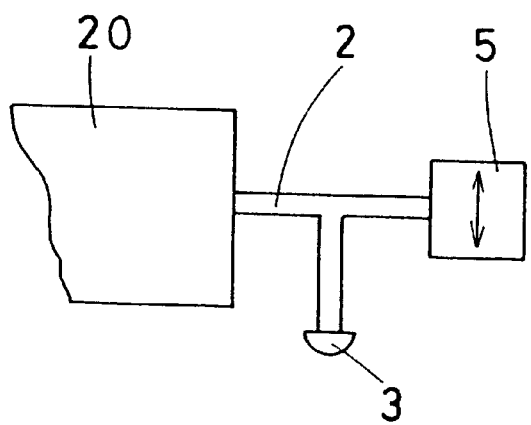
FIG. 32A is a front view.
Figure 32B:
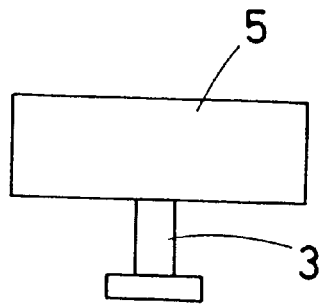
FIG. 32B is a side view.

A sixth embodiment of the present invention is shown in FIGS. 31 and 32. More specifically, the piezo-electric driving device of the sixth embodiment comprises a piezo-electric oscillator 5, a stationary member 20 provided opposite to the direction perpendicular to the oscillation direction of the piezo-electric oscillator 5, a connector 2 provided between the piezo-electric oscillator 5 and the stationary member 20 so as to connect the piezo-electric oscillator 5 to the stationary member 20, and a kicking member 3 projected from the intermediate portion of the connector 2 in the oscillation direction.

In the sixth embodiment, when the piezo-electric oscillator 5 oscillates, the connector 2 rocks in the oscillation direction. The kicking member 3 just diagonally kicks down the driven body 15 as shown in FIGS. 21 and 22, and the driven body 15 is moved only in one direction. Excluding the above-mentioned features, the sixth embodiment is the same as the first embodiment.

When the piezo-electric driving device of the present invention is applied to an actuator, instantaneous stop, abrupt return and abrupt oscillation can be accomplished because of small inertia. When applied to a power source for a wheel, the device is advantageous since it can function as a brake at the time of stop. Furthermore, when the device is applied to an industrial robot, the robot can move back-and-forth, left-to-right and diagonally. Moreover, when the device is applied to a belt conveyor, the conveyor can move back-and-forth and left-to-right. When an oscillator comprising a piezo-electric element is used to transfer magnetic storage media, no magnetism is generated, thereby not damaging stored data.

INDUSTRIAL FIELD OF UTILIZATION

As described above, the piezo-electric driving device of the present invention is useful as drive sources for actuators, wheels, industrial robots, belt conveyors, transfer apparatuses for magnetic storage media, and the like.

I claim:

1. A piezo-electric driving device comprising:

a plurality of piezo-electric oscillators, each having a central portion and end portions, a supporter for supporting said plurality of piezo-electric oscillators in parallel so that said piezo-electric oscillators have a same oscillation direction and supporting said end portions of each of said plurality of piezo-electric oscillators to allow said central portion to perform bending oscillation, a connector for mutually connecting the central portions of said plurality of piezo-electric oscillators in a direction perpendicular to said oscillation direction and to a direction connecting the end portions of each of the plurality of piezo-electric oscillators, and a kicking member projected from said connector in said oscillation direction, wherein said piezo-electric oscillators have different oscillation phases so that said kicking member performs a kicking operation.

2. A piezo-electric driving device according to claim 1, wherein a number of said piezo-electric oscillators is two.

3. A piezo-electric driving device according to claim 1, wherein:

said plurality of piezo-electric oscillators comprises two or more piezo-electric oscillators arranged in parallel along a straight line, and said connector mutually connects said central portions of said two or more piezo-electric oscillators.

4. A piezo-electric driving device comprising:

a plurality of piezo-electric oscillators, each having a central portion and end portions, a supporter for supporting said plural piezo-electric oscillators in a ring-shape so that said piezo-electric oscillators have a same oscillation direction and supporting said end portions of each of said plurality of piezo-electric oscillators to allow said central portion to perform bending oscillation, a radial connector for mutually connecting the central portions of said plurality of piezo-electric oscillators in a direction perpendicular to said oscillation direction, and a kicking member projected from said radial connector in said oscillation direction, wherein said piezo-electric oscillators have different oscillation phases so that said kicking member performs a kicking operation.

5. A piezo-electric driving device comprising:

two piezo-electric oscillators, each having a central portion and end portions, a supporter for supporting said two piezo-electric oscillators arranged in parallel so that oscillation directions of said two piezo-electric oscillators intersect each other and supporting said end portions of each of said plurality of piezo-electric oscillators to allow said central portion to perform bending oscillation, an L-shaped connector for mutually connecting said central portions of said two piezo-electric oscillators in a plane including the oscillation directions of said two piezoelectric oscillators, and a kicking member projected from said connector in said plane, wherein said two piezo-electric oscillators have different phases so that said kicking member performs a kicking operation.

6. A piezo-electric driving device comprising:

a piezo-electric oscillator having a central portion and end portions, a supporter for supporting said end portions of said piezo-electric oscillator to allow said central portion to perform bending oscillation, a stationary member spaced from the piezo-electric oscillator in a direction perpendicular to an oscillation direction of said piezo-electric oscillator and to a direction connecting the end portions, a connector for connecting said central portion of said piezo-electric oscillator to said stationary member, and a kicking member projected from said connector in said oscillation direction.

7. A piezo-electric driving device according to claim 1, wherein the different phases have a phase difference of 45°.

8. A piezo-electric driving device according to claim 1, wherein the different phases have a phase difference of 90°.

9. A piezo-electric driving device according to claim 1, wherein the different phases have a phase difference of 135°.

10. A piezo-electric driving device according to claim 1, wherein each piezo-electric oscillator comprises a piezo-electric element attached to a surface of a bar or plate of elastic metal.

11. A piezo-electric driving device according to claim 4, wherein each piezo-electric oscillator comprises a piezo-electric element attached to a surface of a bar or plate of elastic metal.

12. A piezo-electric driving device according to claim 5, wherein each piezo-electric oscillator comprises a piezo-electric element attached to a surface of a bar or plate of elastic metal.

13. A piezo-electric driving device according to claim 6, wherein the piezo-electric oscillator comprises a piezo-electric element attached to a surface of a bar or plate of elastic metal.

14. A piezo-electric driving device according to claim 1, wherein the kicking member is projected from an intermediate portion of the connector.

15. A piezo-electric driving device according to claim 4, wherein the kicking member is projected from the central portion of the radial connector.

16. A piezo-electric driving device according to claim 5, wherein the kicking member is projected from an intermediate portion of the connector.

17. A piezo-electric driving device according to claim 6, wherein the kicking member is projected from an intermediate portion of the connector.

* * * * *